(12) United States Patent
Claise et al.

(10) Patent No.: US 8,849,473 B2
(45) Date of Patent: Sep. 30, 2014

(54) SYSTEM AND METHOD FOR NOTIFYING AND FOR CONTROLLING POWER DEMAND

(75) Inventors: Benoit Claise, Othee (BE); John D. Parello, Campbell, CA (US); Charles B. Schoening, Little Silver, NJ (US); Emmanuel Tychon, Angleur (BE); Tirthankar Ghose, San Ramon, CA (US)

(73) Assignee: Cisco Technology, Inc., San Jose, CA (US)

(*) Notice: Subject to any disclaimer, the term of this patent is extended or adjusted under 35 U.S.C. 154(b) by 637 days.

(21) Appl. No.: 13/211,798

(22) Filed: Aug. 17, 2011

(65) Prior Publication Data
US 2013/0043730 A1   Feb. 21, 2013

(51) Int. Cl.
| | | |
|---|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G06F 1/32 | (2006.01) |
| H02J 3/00 | (2006.01) |
| G06F 1/26 | (2006.01) |
| H02J 7/34 | (2006.01) |
| G05F 5/00 | (2006.01) |
| H02J 3/14 | (2006.01) |

(52) U.S. Cl.
CPC ........... *G06F 1/266* (2013.01); *H02J 2003/146* (2013.01); *G06F 1/3209* (2013.01); *H02J 3/005* (2013.01); *G06F 1/263* (2013.01); *H02J 7/34* (2013.01)
USPC ........... 700/297; 700/291; 700/295; 323/299; 323/300

(58) Field of Classification Search
USPC ................... 700/291, 295, 297; 323/299, 300
See application file for complete search history.

(56) References Cited

U.S. PATENT DOCUMENTS

| | | | |
|---|---|---|---|
| 4,785,927 A | 11/1988 | Dobbins | |
| 6,269,343 B1 | 7/2001 | Pallakoff | |
| 6,415,270 B1 | 7/2002 | Rackson et al. | |
| 6,618,709 B1 | 9/2003 | Sneeringer | |
| 6,681,156 B1 * | 1/2004 | Weiss | 700/291 |
| 6,686,709 B2 * | 2/2004 | Lee et al. | 315/370 |
| 6,785,592 B1 * | 8/2004 | Smith et al. | 700/291 |
| 6,930,947 B2 | 8/2005 | Chen | |
| 6,980,526 B2 | 12/2005 | Jang et al. | |
| 7,084,752 B2 | 8/2006 | Parello et al. | |
| 7,177,728 B2 | 2/2007 | Gardner | |

(Continued)

FOREIGN PATENT DOCUMENTS

WO   WO2013/025267   2/2013

OTHER PUBLICATIONS

USPTO Jan. 4, 2013 RCE Response to Oct. 5, 2012 Final Office Action from U.S. Appl. No. 12/700,175.

(Continued)

*Primary Examiner* — Ramesh Patel
(74) *Attorney, Agent, or Firm* — Patent Capital Group

(57) ABSTRACT

A method is provided in one example embodiment and includes computing energy usage associated with a domain that includes a plurality of endpoints; identifying particular endpoints of the plurality of endpoints that are capable of switching from a first power source to a battery power source; and communicating a broadcast message to the particular endpoints to switch to their corresponding battery power source.

20 Claims, 7 Drawing Sheets

(56) References Cited

U.S. PATENT DOCUMENTS

| | | | |
|---|---|---|---|
| 7,188,260 B1 * | 3/2007 | Shaffer et al. | 713/300 |
| 7,203,849 B2 | 4/2007 | Dove | |
| 7,263,450 B2 | 8/2007 | Hunter | |
| 7,324,518 B2 | 1/2008 | Dai et al. | |
| 7,337,336 B2 | 2/2008 | Ferentz et al. | |
| 7,366,933 B1 | 4/2008 | Aharonian et al. | |
| 7,392,407 B2 * | 6/2008 | Jonnala et al. | 713/300 |
| 7,698,580 B2 * | 4/2010 | Schindler et al. | 713/300 |
| 7,734,572 B2 | 6/2010 | Wiemeyer et al. | |
| 7,908,501 B2 | 3/2011 | Kim et al. | |
| 7,921,306 B2 | 4/2011 | Dove | |
| 7,941,677 B2 | 5/2011 | Penning | |
| 7,966,502 B2 | 6/2011 | Diab et al. | |
| 7,974,298 B2 | 7/2011 | Baird et al. | |
| 8,160,753 B2 | 4/2012 | Ferentz et al. | |
| 8,225,124 B2 | 7/2012 | Geiger et al. | |
| 8,250,381 B2 | 8/2012 | Hansalia et al. | |
| 8,261,104 B2 | 9/2012 | Landry et al. | |
| 8,301,918 B2 | 10/2012 | Diab et al. | |
| 8,352,754 B2 | 1/2013 | Chin | |
| 8,407,332 B1 | 3/2013 | Kralpak et al. | |
| 2002/0016639 A1 | 2/2002 | Smith et al. | |
| 2002/0040475 A1 | 4/2002 | Yap et al. | |
| 2002/0157030 A1 | 10/2002 | Barker et al. | |
| 2003/0120959 A1 | 6/2003 | Bohrer | |
| 2004/0148388 A1 | 7/2004 | Chung et al. | |
| 2005/0055589 A1 | 3/2005 | Kojo | |
| 2005/0123109 A1 | 6/2005 | Yamagishi et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0135086 A1 | 6/2007 | Stanford | |
| 2007/0143637 A1 | 6/2007 | Tsai | |
| 2007/0189257 A1 | 8/2007 | Suzuki et al. | |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda | |
| 2008/0052546 A1 * | 2/2008 | Schindler et al. | 713/300 |
| 2008/0063381 A1 | 3/2008 | Conroy et al. | |
| 2008/0178232 A1 | 7/2008 | Velusamy | |
| 2008/0215899 A1 | 9/2008 | Jonnala et al. | |
| 2008/0215902 A1 * | 9/2008 | Jonnala et al. | 713/320 |
| 2008/0225841 A1 | 9/2008 | Conway et al. | |
| 2008/0244282 A1 | 10/2008 | Hansalia et al. | |
| 2008/0256371 A1 | 10/2008 | Diab et al. | |
| 2008/0272741 A1 | 11/2008 | Kanamori | |
| 2008/0301322 A1 | 12/2008 | Horibe | |
| 2008/0303486 A1 | 12/2008 | Kao | |
| 2009/0049315 A1 | 2/2009 | Diab et al. | |
| 2009/0070603 A1 | 3/2009 | Diab et al. | |
| 2009/0083167 A1 | 3/2009 | Subbloie | |
| 2009/0182834 A1 | 7/2009 | Zettler et al. | |
| 2009/0195349 A1 | 8/2009 | Frader-Thompson | |
| 2009/0196281 A1 | 8/2009 | Kouchri | |
| 2009/0217063 A1 | 8/2009 | Tomita | |
| 2009/0217188 A1 | 8/2009 | Alexander et al. | |
| 2009/0228723 A1 | 9/2009 | Yoshizaki | |
| 2009/0249091 A1 | 10/2009 | Goodnow | |
| 2009/0263127 A1 | 10/2009 | Haran et al. | |
| 2009/0282277 A1 | 11/2009 | Sedarat et al. | |
| 2009/0310607 A1 | 12/2009 | Evans | |
| 2010/0052421 A1 | 3/2010 | Schindler et al. | |
| 2010/0070217 A1 * | 3/2010 | Shimada et al. | 702/62 |
| 2010/0080111 A1 | 4/2010 | Diab et al. | |
| 2010/0111523 A1 | 5/2010 | Hirth et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0205466 A1 | 8/2010 | Diab et al. | |
| 2010/0235868 A1 | 9/2010 | Howarter et al. | |
| 2010/0241880 A1 | 9/2010 | Wertheimer et al. | |
| 2010/0247068 A1 | 9/2010 | Howarter et al. | |
| 2010/0309904 A1 | 12/2010 | Couse | |
| 2010/0322078 A1 | 12/2010 | Wang et al. | |
| 2010/0329108 A1 | 12/2010 | Diab et al. | |
| 2011/0022699 A1 | 1/2011 | Powell et al. | |
| 2011/0029796 A1 | 2/2011 | Matthews et al. | |
| 2011/0067048 A1 | 3/2011 | Barton et al. | |
| 2011/0072286 A1 | 3/2011 | Graham | |
| 2011/0125337 A1 | 5/2011 | Zavadsky | |
| 2011/0131428 A1 | 6/2011 | Diab et al. | |
| 2011/0157939 A1 | 6/2011 | Wang | |
| 2011/0199046 A1 | 8/2011 | Tsai | |
| 2011/0239019 A1 | 9/2011 | Johnston | |
| 2011/0246797 A1 | 10/2011 | Diab et al. | |
| 2012/0045210 A1 | 2/2012 | Kim et al. | |
| 2012/0095610 A1 | 4/2012 | Chapel et al. | |
| 2012/0120958 A1 | 5/2012 | Mahadevan et al. | |
| 2012/0226918 A1 | 9/2012 | Rallo | |
| 2012/0284537 A1 | 11/2012 | Kruglick | |
| 2013/0303202 A1 | 11/2013 | Jafarian et al. | |

OTHER PUBLICATIONS

USPTO Jan. 16, 2013 Final Office Action from U.S. Appl. No. 12/368,124.
U.S. Appl. No. 13/736,035, filed Jan. 7, 2013, entitled "System and Method for Querying for Energy Data in a Network Environment," Inventor: Tirthankar Ghose, et al.
USPTO Mar. 28, 2012 Notice of Allowance from U.S. Appl. No. 12/368,154.
UsSPTO May 3, 2013 Non-Final Office Action from U.S. Appl. No. 12/368,124.
USPTO Jun. 14, 2013 Response to Mar. 20, 2013 Non-final Office Action from U.S. Appl. No. 12/826,416.
USPTO JU1. 5, 2013 Non-Final Office Action from U.S. Appl. No. 13/302,544.
Bruce Nordman, "Energy Efficient Ethernet: Outstanding Questions," Mar. 12, 2007; 3 pages http://grouper.ieee.org/groups/802/3/eee_study/public/mar07/nordman2_01_0307.pdf.
Onn Haran, "Applicability of EEE to Fiber PHYs," IEEE 8.02.3 EEE Meeting; Sep. 2007, Seoul, Korea http://www.ieee802.org/3/eee_study/public/sep07/haran_1_0907.pdf; 12 pages.
Mike Bennett, "IEEE 802.3az Energy Efficient Ethernet," Task Force Update, Presented to the P802.3ba Task Force, Denver, CO; Jul. 16, 2008; 17 pages http://www.ieee802.org/3/az/public/jul08/bennett_03_0708.pdf.
Aviad Wertheimer and Eric Mann, "Active/Idle Toggling with Low-Power Idle," IEEE 802.3az Jan. 2008 Interim Meeting; 15 pages.
Bruce Nordman, et al., "Energy Efficiency and Regulation," IEEE 802 Tutorial;Jul. 13, 2009; 58 pages.
SMART Board™, "Interactive Whiteboard," Sep. 2005; 2 pages.
"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)," © 2003 IEEE, Jun. 18, 2003, 121 pages.
Benoit Claise, et al., "Energy Management (eman): Description of Working Group," retrieved and printed on Aug. 17, 2011, 3 pages; http://datatracker.ietf.org/wg/eman/charter/.
Battery University, "How to Prolong Lithium-based Batteries," © 2011 Isidor Buchmann, 15 pages http://www.batteryuniversity.com/parttwo-34.htm.
U.S. Appl. No. 12/368,124, filed Feb. 9, 2009, entitled "System and Method for Intelligent Energy Management in a Network Environment," Inventor(s): Tirthankar Ghose et al.
U.S. Appl. No. 12/368,154, filed Feb. 9, 2009, entitled "System and Method for Querying for Energy Data in a Network Environment," Inventor(s): Tirthankar Ghose et al.
U.S. Appl. No. 12/700,175, filed Feb. 4, 2010, entitled "System and Method for Managing Power Consumption in Data Environments," Inventor: Anoop Vetteth.
U.S. Appl. No. 12/826,416, filed Jun. 29, 2010, entitled "System and Method for Providing Intelligent Power Management in a Network

(56) References Cited

OTHER PUBLICATIONS

Environment," Inventors: Ram Mohan R., et al.
USPTO Jun. 23, 2011 Nonfinal Office Action from U.S. Appl. No. 12/368,124.
USPTO Sep. 23, 2011 Response to Jun. 23, 2011 Nonfinal Office Action filed in U.S. Appl. No. 12/368,124.
USPTO Jun. 28, 2011 Nonfinal Office Action from U.S. Appl. No. 12/368,154.
"Cisco Energywise"; Cisco Systems; Feb. 1, 2009; archived from http://www.archive.org; pp. 1-6.
U.S. Appl. No. 13/226,326, filed Sep. 6, 2011, entitled "Power Conservation in a Distributed Digital Video Recorder/Content Delivery Network System," Inventor: William VerSteeg.
USPTO Nov. 18, 2011—Final Office Action from U.S. Appl. No. 12/368,154.
"Wake on Local Area Network (LAN)," EnergyStar Products, Energy Star; [printed on Nov. 16, 2011]; 4 pages http://www.energystar.gov/index.cfm?c=power_mgt.pr_power_mgt_wol.
USPTO Aug. 7, 2012 Response to May 24, 2012 Non Final Office Action from U.S. Appl. No. 12/700,175.
USPTO Aug. 22, 2012 Non-Final Office Action from U.S. Appl. No. 12/368,124.
USPTO Sep. 19, 2012 Response to Jun. 20, 2012 Non-Final Office Action from U.S. Appl. No. 12/826,416.
USPTO Oct. 5, 2012 Final Office Action from U.S. Appl. No. 12/700,175.
USPTO Oct. 12, 2012 Request for Continued Examination from U.S. Appl. No. 12/368,154.
USPTO Oct. 23, 2012 Third Notice of Allowance from U.S. Appl. No. 12/368,154.
USPTO Oct. 25, 2012 Final Office Action from U.S. Appl. No. 12/826,416.
USPTO Nov. 21, 2012 Response to Aug. 22, 2012 Non-Final Office Action from U.S. Appl. No. 12/368,124.
USPTO Nov. 11, 2013 RCE Response to Aug. 9, 2013 Final Office Action from U.S. Appl. No. 12/826,416.
USPTO Oct. 8, 2013 Response to Jul. 5, 2013 Non-Final Office Action from U.S. Appl. No. 13/302,544.
USPTO Oct. 25, 2013 Final Office Action from U.S. Appl. No. 13/302,544.
U.S. Appl. No. 13/302,544, filed Nov. 22, 2011, entitled "System and Method for Network Enabled Wake for Networks," Inventors: Charles B. Schoening, et al.
PCT Sep. 5, 2012 International Search Report and Written Opinion from International Application Serial No. PCT/US12/37359 10 pages.
USPTO Jan. 8, 2014 Notice of Allowance from U.S. Appl. No. 12/368,124.
USPTO Jan. 27, 2014 Notice of Allowance from U.S. Appl. No. 13/736,035.
USPTO Feb. 10, 2014 Non-Final Office Action from U.S. Appl. No. 12/826,416.
USPTO Feb. 6, 2014 Non-Final Office Action from U.S. Appl. No. 13/302,544.
USPTO Jan. 1, 2014 Non-Final Office Action from U.S. Appl. No. 13/226,326.
U.S. Appl. No. 13/492,617, filed Jun. 8, 2012, entitled "System and Method for Detecting a Power Source and Metering Points of a Network Device in a Network Environment," Inventor: John D. Parello, et al.
USPTO Feb. 7, 2012 RCE Response to Final Office Action mailed Nov. 10, 2011 from U.S. Appl. No. 12/368,124.
USPTO Feb. 16, 2012 RCE Response to Final Office Action mailed Nov. 18, 2011 from U.S. Appl. No. 12/368,154.
USPTO Apr. 16, 2013 RCE Response to Final Office Action dated Jan. 16, 2013 from U.S. Appl. No. 12/368,124.
USPTO Mar. 20, 2013 Non-final Office Action from U.S. Appl. No. 12/826,416.
USPTO Oct. 11, 2011—Response to Jun. 28, 2011 Nonfinal Office Action from U.S. Appl. No. 12/368,154.
USPTO Nov. 10, 2011 Final Office Action from U.S. Appl. No. 12/368,124.
Jetzt, et al., LLDP/LLDP-MED Proposal for PoE Plus,; PoE Plus Task Force, Sep. 15, 2006, Knoxville, TN; 15 pages.
USPTO Aug. 2, 2013 Response to May 3, 2013 Non-Final Office Action from U.S. Appl. No. 12/368,124.
USPTO Sep. 11, 2013 Final Office Action from U.S. Appl. No. 12/368,124.
USPTO Sep. 18, 2013 Non-Final Office Action from U.S. Appl. No. 13/736,035.
USPTO Aug. 9, 2013 Final Office Action from U.S. Appl. No. 12/826,416.
USPTO May 24, 2012 Non Final Office Action from U.S. Appl. No. 12/700,175.
USPTO Jun. 20, 2012 Non-Final Office Action from U.S. Appl. No. 12/826,416.
USPTO Jun. 22, 2012 Request for Continued Examination from U.S. Appl. No. 12/368,154.
USPTO Jul. 17, 2012 Second Notice of Allowance from U.S. Appl. No. 12/368,154.
Wertheimer, et al., "Capabilities Negotiation Proposal for Energy-Efficient Ethernet," IEEE 802.3az, May 2008, pp. 1-18.
PCT Feb. 18, 2014 International Preliminary Report on Patentability from International Application Serial No. PCT/US12/37359 7 pages.
USPTO Feb. 27, 2014 Non-Final Office Action from U.S. Appl. No. 12/700,175.
USPTO May 22, 2014 Non-Final Office Action from U.S. Appl. No. 13/302,544.

\* cited by examiner

SYSTEM AND METHOD FOR NOTIFYING AND FOR CONTROLLING POWER DEMAND

TECHNICAL FIELD

This disclosure relates in general to the field of energy and, more particularly, to a system and a method for notifying and for controlling power demand.

BACKGROUND

Energy consumption has become a preeminent concern for industrialized societies. Both consumers and businesses have become aware of their energy usage. Whether motivated by altruistic reasons, or by profitability concerns, individuals have come to terms with the notion that energy is a finite commodity: a commodity having accompanying costs that should be managed. Administrators now focus on power usage and, more specifically, on how to reduce those expenditures. In recent times, device manufacturers have added instrumentation and features in the network to quell these concerns. However, as network systems have become more sophisticated, while energy demands have continued to increase, architectures continue to fail in matching network capabilities with more intelligent energy consumption.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes computing energy usage associated with a domain that includes a plurality of endpoints; identifying particular endpoints of the plurality of endpoints that are capable of switching from a first power source to a battery power source; and communicating a broadcast message to the particular endpoints to switch to their corresponding battery power source. The energy usage can include information associated with wattage, consumption, voltage, current, energy metrics of any kind, existing power levels, specific energy data associated with particular domains, specific endpoints, across a broader spectrum, etc. Such information can be granular in nature, or provided in an aggregated format (e.g., for an entire campus, for an entire building, for a domain, for a group of endpoints, etc.).

In more particular embodiment, the method can include receiving energy demand data; receiving energy pricing information; and identifying a time interval associated with higher energy demands, where the broadcast message before the time interval occurs. Note that the energy demand data and the energy pricing information may be provided by a service provider, a power company, any type of utility entity, an internal server or database, etc. The energy demand data can be reflective of energy consumption across endpoints, domains, campuses, business segments, etc. The energy pricing information can be associated with costs per individual endpoints, domains, campuses, business segments, etc. In specific embodiments, the broadcast message can include a time interval for which the particular endpoints use their corresponding battery power source.

Additionally, the method can include communicating a second broadcast message to the particular endpoints to discontinue using their corresponding battery power source. The method can also include receiving acknowledgments from at least some of the particular endpoints, where the acknowledgments indicate that at least some of the particular endpoints will switch to their corresponding battery power source. A discovery protocol can be used in order to identify which of the plurality of endpoints have a capability to switch to their corresponding battery power source.

At least some of the particular endpoints can evaluate their current battery level in order to determine that a recommendation within the broadcast message will not be followed. The broadcast message can indicate at least some of the particular endpoints should switch to their corresponding battery source until associated battery levels fall below a designated percentage of battery life.

Example Embodiments

Figure 1:
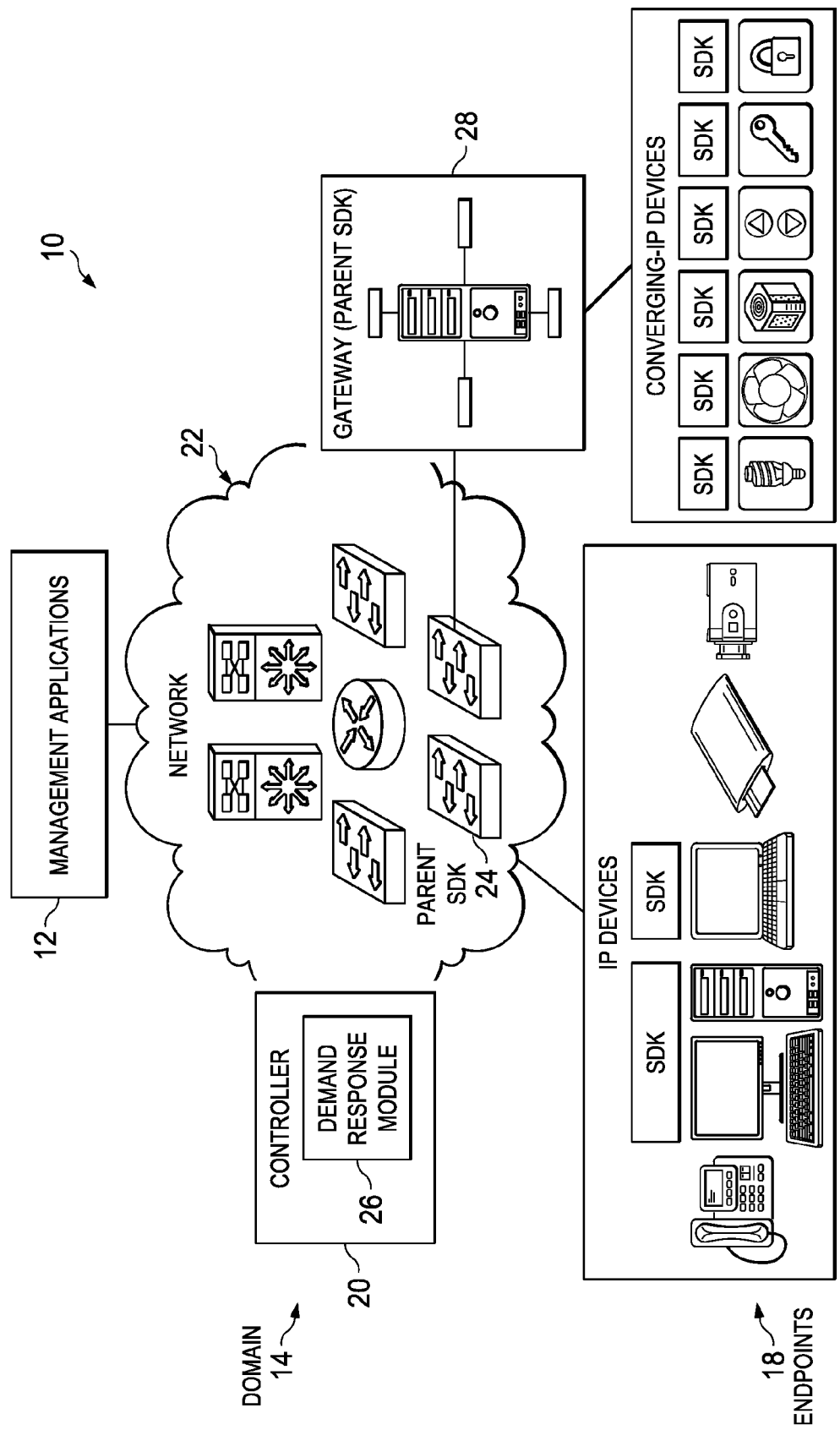
FIG. 1 is a simplified block diagram of an energy management system in accordance with one embodiment of the present disclosure.

FIG. 1 is a simplified block diagram of an energy management system 10 in accordance with one example implementation of the present disclosure. FIG. 1 includes a domain 14, which can include any number of devices such as wireless controllers, access points (APs), routers, switches, etc., which can be part of a network 22. A controller 20 can be provisioned in network 22 in order to execute some of the power management activities discussed herein. Controller 20 may include a demand response module 26, which can interface with Internet Protocol (IP) devices. Additionally, a gateway 28 may be provisioned in network 22 such that it can interface with converging-IP devices, as is being illustrated in FIG. 1.

In this particular implementation, any of the infrastructure of domain 14 can interact with a number of endpoints 18 (e.g., personal computers (PCs), building controllers, wireless devices, telephones, lighting fixtures, HVAC systems, video devices (e.g., Telepresence systems), etc. Certain endpoints 18 may be associated with IP devices having corresponding Software Development Kit (SDK) elements. Similarly, gateway 28 may operate as a parent SDK for its child endpoints. Domain 14 is also coupled to a set of power management applications 12, which may include elements such as a local area network (LAN) management element, etc. Management applications 12 can operate to intelligently control (directly or indirectly) any of the devices of FIG. 1.

In general terms, energy management system 10 measures power for network-connected endpoints (phones, AP's, PCs, building systems, etc.) and, further, provides command and control for these endpoints. The activities of energy management system 10 may include broadcasting messages to individual endpoints for shifting from one power source to a different power source (e.g., during peak demand time intervals), as further discussed below. From a business perspective, the smart loading capabilities of the architecture allow for a realizable and significant cost savings. Furthermore, energy management system 10 provides a mechanism that understands the power consumption characteristics of endpoints for which it has responsibility. This can include understanding which endpoints can shift from one power source (e.g., the grid) to a different power source (e.g., an internal battery). Additionally, the architecture is configured to query for power information using the network and, furthermore, implement time-of-day policies to control the entities. In essence, the network can operate as a control plane for controlling the energy consumption/usage for one or more devices within a domain. In this sense, the network serves as a platform for energy control.

Before turning to additional operational capabilities of energy management system 10, certain foundational information is provided in order to elucidate some of the problematic areas associated with managing energy consumption across the network. Such information is offered earnestly for purposes of discussion only and, accordingly, should not be construed in any way to limit the broad scope of the present disclosure. The architecture of energy management system 10 can allow for the management of PCs connected to switches, wireless access point, etc. using the network to monitor, control, and (ultimately) save energy. Concurrently, one driver behind the SmartGrid initiative is the avoidance of a blackout (i.e., a power outage). This issue can be addressed through the architecture of the present disclosure by communicating appropriate messages to electricity consumers in order to proactively reduce their power consumption for a period of time.

There are additional use cases that are relevant to consider in energy consumption scenarios involving energy management system 10. One use case is associated with brownouts, which can occur when too much demand causes voltages to sag in a given location. Another use case (more monetary in nature) is associated with a site-specific active demand control to prevent peak demand charges. This latter use case could be addressed (in operational terms) systematically, where appropriate provisioning would occur each day. For example, consider an instance in which demand spikes at 9:00 AM each day (e.g., as employees arrive at their job environment, turn on the lights, adjust thermostats, start coffee makers, etc.). Energy management system 10 can instruct PCs to use their corresponding batteries from 8:50 AM-9:15 AM in an effort to smooth out demand and, thereby, reduce utility peak demand charges.

In operation, energy management system 10 is configured to communicate a broadcast message that requests network devices to shift to battery resources instead of using a power outlet. This broadcast message can be triggered in cases of excess power demand, based on specific policies, based on administrator preferences, based on cost considerations, etc. Consider an example campus network deployment, where users are connected to the network with their PCs, while they draw power from an outlet (e.g., when connected to a simple docking station). If an emergency message is received from the SmartGrid (e.g., indicating to a PC that it should reduce power consumption), a broadcast message can be communicated to each PC, where the broadcast message is requesting/instructing the PCs to shift to their internal battery (e.g., for a specific period of time). This would reduce the total power consumed and, further, it would postpone the excess demand, which would avoid the potential blackout/brownout scenarios identified above. Note that such a mechanism does not force personal computers to operate in a different, potentially suboptimal, power state. Instead, there is no interruption in functionality, nor is there any degradation of performance, as connected endpoints simply shift between power sources.

Separately, if this set of activities were taken to their logical next step, the notifications can be used in scenarios where static PCs (e.g., the personal computers that remain connected overnight) can be charging during the night. In most cases, the night hours are ideal for charging activities because this is when the energy demands (and costs) are lowest. It should be noted that utility companies systematically charge consumers higher electricity prices during peak consumption (e.g., typically from 12 PM to 2 PM). Power levels of an organization frequently encroach on designated peak thresholds.

The architecture of the present disclosure can essentially drop these higher power levels (being consumed by the enterprise) in order to avoid power overage charges, power premium fees, etc. This can be accomplished by leveraging battery capacities of various endpoints, which are operating in the network. In essence, the messaging protocol described herein would effectively spread the demand uniformly across the day by decoupling energy sources at opportune times. This would engender a better energy balance between battery-powered devices (inclusive of battery-powered cars, uninterruptible power supplies (UPS), etc.) and the power grid.

The specific broadcast message could be formatted in any appropriate manner, provisioned as part of a standard (e.g., IETF Energy Management Standard), offered as a proprietary signaling mechanism, provisioned as part of existing signaling (e.g., discovery protocols, heartbeat messaging, keep alive messaging, type-length-value (TLV) paradigms, etc.), provisioned internally in the actual endpoints, which could reference a policy instructing them to switch power sources at certain times, etc. Any message format could be used to accommodate the energy management activities being discussed herein. This includes directing networked devices to shift energy resources in a particular fashion and/or for a particular time interval. Note that the term 'switch' as used herein in this Specification is broad in that it includes any type of decoupling, disconnection, interruption, withdrawal, release, suspension, detachment, or any other suitable disengagement from a first power source to a second power source. The individual power sources are not necessarily equivalent, but certainly could be. The particular power sources can include power bricks, batteries (external or internal), DC sources, AC sources, power outlets, generators, solar panels, or any other suitable power source, which may be based on particular needs or specific energy configurations.

In particular scenarios, when a battery is already operating at a low level, the given network device (e.g., the laptop) can choose to ignore the broadcast message and, thus, remain connected to the power outlet in order to prevent data loss. Such conditions are dynamic and, therefore, energy management system 10 is configured to be responsive to existing environmental constraints. Additionally, it should be noted that although the examples detailed herein may involve personal computing devices, the broadcast messaging mechanism is valid for any networked device that is able to switch to a different power source (e.g., a battery) from a power outlet.

For example, an external battery pack, backup generators, etc. can be used by IP phones, routers, HVAC systems, etc. in order to even out energy demands in a given system.

Logistically, a parent-child relationship can exist between the network infrastructure (e.g., a router, a switch, etc.) and its associated endpoints. Broadcast messages can be exchanged between these components at appropriate times. Any suitable management application can collect energy usage parameters (e.g., across an entire domain for which it is responsible) and, subsequently, determine the power shedding/power source switching that should occur.

Controller 20 and/or management applications 12 can send out broadcast messages to endpoints 18, to selected endpoints, to selected groups of endpoints, etc. in order to instruct them that they should shed power (to any appropriate degree), and/or switch power sources. In one particular example, the endpoints are adapted to interpret the broadcast messages (or to interpret an internal policy) such that the endpoints can readily switch to battery usage during a peak demand window. In certain implementations, the broadcast messages received by the endpoints would include an assigned time interval for the endpoints to remain on battery power.

Additional instructions can indicate particular modes for transitioning from the battery source (e.g., transitioning to a sleep mode after disconnecting from the battery source, transitioning to a power down mode after disconnecting from the battery source, transitioning to normal operations associated with a power outlet, etc.). Note that even if the endpoints cannot necessarily accommodate the full time interval, the endpoints can still disconnect from their current power source and shift to battery usage for as long as would be practical. In this sense, a broadcast message can be viewed as a suggestion in certain scenarios, and not necessarily as a strict requirement for the endpoints to follow.

The management application can alert designated endpoints to shed power (e.g., disconnect from the grid and/or begin using their provision batteries) using various communication protocols. In one example, a simple broadcast message can be used to deliver this alert over the wired network. In other instances, a wireless access point can deliver this alert wirelessly via management frames in a corresponding 802.11 message. Note that in particular use cases, the Energy Efficient Ethernet protocol (e.g., IEEE 802.3az) can be involved in such messaging. Other protocols can include proprietary mechanisms, unicasting activities, multicasting activities, simple TCP/IP communications, User Datagram Protocol (UDP) communications, any appropriate discovery protocol, etc.

In operation, the demand response broadcast messages instruct the devices to shift into different power states. In particular implementations involving personal computers, the broadcast message includes a Windows™ PowerCfg command, which instructs an endpoint to switch to its battery source, and to disconnect itself from the grid. Moreover, existing protocols in the endpoints can be used as a mechanism to affect the power source change. For example, 'Desktop and mobile Architecture for System Hardware' (DASH) and vPro (e.g., in Intel environments) can be leveraged to achieve this activity. In other instances, Windows Management Instrumentation (WMI) could be leveraged for the change. WMI is simply an API in the Windows operating system that enables devices and systems in a network (e.g., typically enterprise networks) to be managed and controlled. Often utilizing common information model (CIM), WMI allows network administrators to query and manage workstations, applications, networks, etc.

An agent provisioned in the endpoints (e.g., as discussed below with reference to FIG. 4) can interpret the broadcast message in order to switch power sources. In some cases where enhanced intelligence is provided in a power source, the power source itself could actively be involved in this transitioning scenario because there can be a continued power draw (often referred to as a 'vampire draw') from a power brick continuing to drain power from a given outlet. In yet other scenarios, the personal computer could actively participate in these activities by implementing a mechanism (e.g., provisioning software, providing instructions, etc.) for the power supply, which can be configured to disconnect itself from the grid.

Operationally, the endpoints can return to a charging power outlet based on any number of potential options. For example, one option may be associated with a timeout message provided in the broadcast message. The message would indicate, for example, to switch to a battery source for the next 15 minutes. Another option would involve a second broadcast message sent to instruct the endpoint to reconnect to the grid. Another option would involve a timeout message based on a given battery percentage (e.g., disconnect the endpoint until it reaches a 20% battery life). Other options can be based on the endpoint itself, where a local policy is used to instruct the endpoint when to reconnect to a power outlet. Still other options can involve default-timing mechanisms (specific to each endpoint) such that the endpoints would automatically shift to their normal power outlet after some predefined time interval (e.g., 60 minutes, etc.).

Note that certain infrastructure may be aware of whether endpoints have the option of utilizing a battery source. For example, in an EnergyWise™ domain, the switch to which PCs are connected, would know that the personal computers have a battery (e.g., due to the information provided by the EMAN IETF WG http://datatracker.ietf.org/wg/eman/charter/). Other mechanisms for knowing (ahead of time) the battery options of the endpoints can involve simple provisioning by administrator, discovery mechanisms when endpoints come online, querying activities involving individual endpoints, etc.

A number of advantages can be achieved by the architecture of energy management system 10. For example, the architecture is configured to intelligently control power from a network perspective. Additionally, the architecture effectively avoids potential brownouts and blackouts caused by excess demand by leveling the energy demand across a time spectrum. Along similar lines, the architecture can pragmatically postpone or distribute the energy demand more efficiently based on alternative energy sources. Due to its enhanced intelligence, the architecture can systematically spread energy demands (in a uniform manner) across the day, where certain batteries can be charging during off peak hours (e.g., night hours), and subsequently used during high-energy demand time intervals (e.g., 12 PM-2 PM). Note that there is an additional benefit to charging/discharging endpoints in the manner outlined herein, as such activities can suitably maintain a healthy battery life. A sub-optimal scenario can involve maintaining a fully charged battery at elevated temperatures. Such a scenario would erode battery life and consume energy needlessly. This scenario can be effectively avoided by the capabilities being provided by energy management system 10.

In addition, the architecture of energy management system 10 allows network and network-attached equipment to take advantage of a configuration that includes no central processing and no central repository. Such a configuration also offers the advantage of having no single point of failure. The group in a cloud (i.e., the network) can be self-managed, where there is no central control. Controller 20 can be representative of a single computing device, which could be provisioned anywhere in the network, or a plurality of controllers 20 can be provisioned at strategic locations in the network, as further described below.

Further, the configuration of energy management system 10 is protocol agnostic, where virtually any communication transport can be used. The system allows cloud computing to be done to a variable number of entities (all of which may have different types of ASICS, OSs, etc.). Dynamically, endpoints 18 can join and leave the heterogeneous environment, where various types of endpoints can be readily managed by energy management system 10.

As a stand-alone solution, energy management system 10 enables businesses to monitor and to control the electric consumption of networking equipment. An administrator can monitor devices like switches and routers, as well as LAN switch connected Power over Ethernet (PoE) devices such as phones, access points, IP security cameras, door access equipment, etc. Energy management system 10 also has the ability to monitor and to control the energy demands of AC powered devices such as smart power distribution units, networked building systems, office equipment, etc. Energy management system 10 also includes an open interface to allow 3rd party management systems to participate in the framework. This simplifies integration of power reporting and automation into existing business practices.

Briefly discussing some of the possible signaling of the architecture, the system can leverage a simple network management protocol (SNMP) and a secure socket layer (SSL) protocol [as part of a management application program interface (API), potentially included in controller 20] to execute some of the functions of example embodiments of the present disclosure. Management applications 12 can be tailored for particular facilities or for specific IT scenarios. Management applications 12 can be configured to correlate power data with location, and allocate power accordingly. Switches and routers can readily communicate through a management API, where the network can aggregate status and power information. In terms of a client protocol, this element can communicate status and receive policies.

Figure 2:
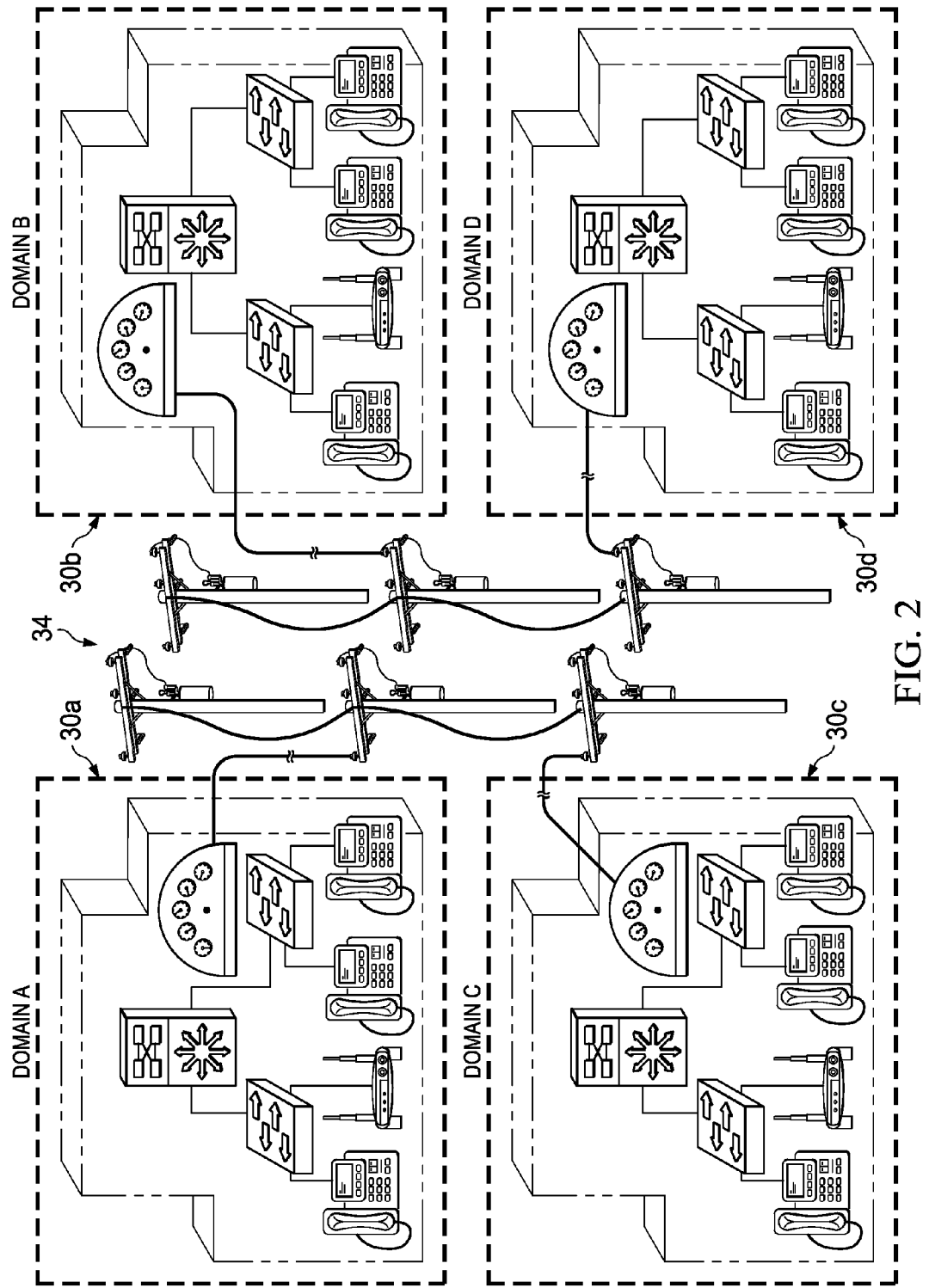
FIG. 2 is a simplified block diagram illustrating example domains associated with the system in accordance with one embodiment of the present disclosure.

Turning to FIG. 2, FIG. 2 is a simplified block diagram illustrating a number of domains 30a-d, which are coupled to corresponding energy sources 34. Each of domains 30a-d can include any number of endpoints (with accompanying infrastructure) provisioned in any suitable computing environment. Energy management system 10 is configured to leverage the network to enable monitoring and controlling of connected endpoints. The architecture allows the network to form a control plane for energy management and, further, offers IT organizations a tool for managing energy more effectively.

Endpoints 18 are representative of power consumers of any kind. For example, endpoints 18 can be representative of Power over Ethernet (PoE) and non-PoE devices that can connect to the network. Further, endpoints 18 can include nontraditional network devices such as facility controllers, lighting, heating ventilation, and air conditioning (HVAC), etc. The term 'endpoint' can also be inclusive of devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, a Telepresence system, an access point, a router, a switch, a gateway, a server, or any other device, component, element, or object capable of facilitating voice, audio, or data exchanges within energy management system 10.

Endpoints 18 may also be inclusive of a suitable interface to an end user, such as a microphone, a display, or a keyboard or other terminal equipment. Endpoints 18 may also include any device that seeks to initiate a communication on behalf of another entity or element, such as a program, a database, or any other component, device, element, or object capable of initiating a voice or a data exchange within energy management system 10. Data, as used herein, refers to any type of video, numeric, voice, packet, or script data, or any type of source or object code, or any other suitable information in any appropriate format that may be communicated from one point to another. Additional details relating to endpoints are provided below with reference to FIG. 4.

In regards to the management API for management applications 12, there can be two methods for a management application to communicate with the network: SNMP and SSL. The MIB can be available on each enabled network device and can include power usage, power policy, alarms, etc. The MIB can provide per-device information. Network management systems interested in a network-wide query can use the SSL interface. The SSL interface can allow a single switch to query/set information from/to all switches in a domain.

Members of the domains may include switches, routers, network controllers, gateways, network appliances, or any other suitable network infrastructure, which make up the data network proper. Domain members are similar to endpoints in that they draw power, but they also have the special ability to act together to propagate messages across the network, to form a domain with other domain members and such or the endpoints. The domain is much like a community in network management, where the domain forms a unit of power management. Hence, the domains are a logical group of entity devices. Additionally, managers (e.g., control applications) can be used to measure, monitor, and manage power consumption.

In terms of relationships, the domain members (e.g., the switches and the routers) can operate as "neighbors" while establishing "parent-child" relationships with endpoints. Keywords can be used to tag devices with labels to filter searches or queries. The actual queries can determine energy usage, set power levels and/or power states across the network. The actual power level indicates the power state of an entity. An application/CLI can set power levels on endpoints. In regard to importance, devices can be differentiated by how they can be affected by power state changes. Additionally, policies can be set with a network-based query to make power state changes (e.g., "change phones in the network to a battery power state . . . "). For example, the network query can be initiated on one switch and then propagated across the network.

The ability to create tags or keywords is available in energy management system 10, and these can be used improve the search capability of a network based query. Any arbitrary set of keywords can be defined per port, per network device, per endpoint, per domain, etc. For example, a given client such as a personal computer can have specific keywords stored within the device such that, as the client moves between ports, the keywords will follow the device. Note that energy management system 10 can include many of the energy management protocols, activities, formatting, interactions, etc., discussed in pending U.S. patent application Ser. No. 12/368,154 and entitled "SYSTEM AND METHOD FOR QUERYING FOR ENERGY DATA IN A NETWORK ENVIRONMENT"

(filed Feb. 9, 2009), which is hereby incorporated in its entirety into this Specification.

Figure 3:
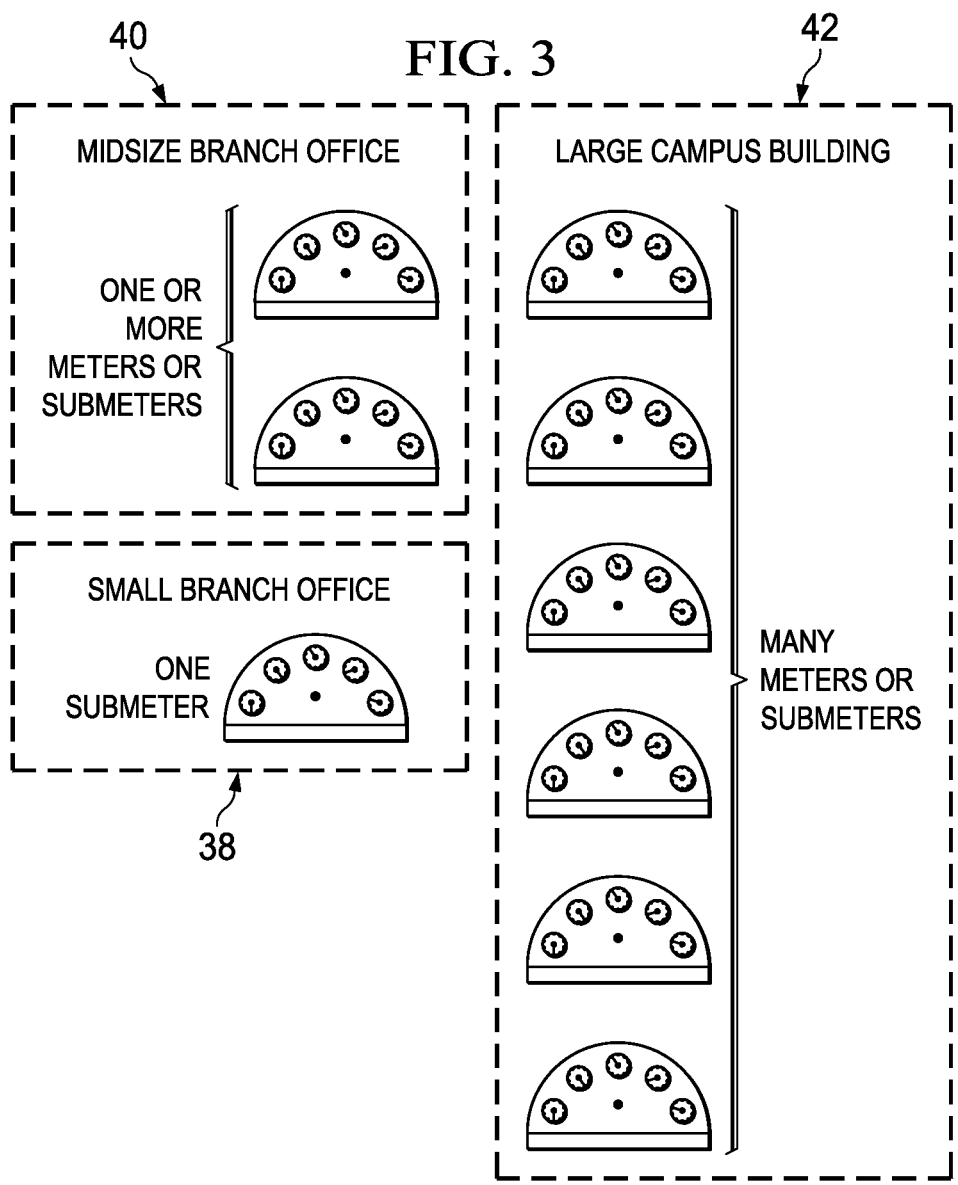
FIG. 3 is a simplified block diagram illustrating example environments for the system.

FIG. 3 is a simplified block diagram illustrating possible environments for energy management system 10. In this particular example, a small branch office 38, a midsize branch office 40, and a large campus building 42 are being illustrated. Any number of meters, or submeters are also provisioned within each segment. In terms of setting up a given location for energy management system 10, consider an example involving one building with a core router, 10 access switches, and 400 endpoints (e.g., phones, access points, PCs, etc.). The routers and switches are configured to be members of a single domain, which can be designated with a certain title (e.g., Midsize XXX Building).

Once the core router and access switches are configured, the domain self-organizes (e.g., using a cloud computing architecture). It does this by automatically setting up neighbor relationships among the domain members. If a discovery mechanism is available (e.g., Cisco Discovery Protocol (CDP)), these devices can use it to establish an overlay network of neighbors. If a discovery protocol is not enabled, then the platform can use UDP to discover neighbors. Static neighbors can also be provisioned if an entity is not reachable using a discovery protocol or UDP. Each domain member can then establish a parent/child relationship with any attached endpoints (for example, an IP phone attached to a PoE switch or an air handler attached to an HVAC controller). In this particular example, the 400 phones, access points, and PCs would become child endpoints of their parent domain members. In addition, endpoints can become part of the domain by running agents that use an appropriate SDK.

Once established, a single cloud is then viable, where the cloud would include networked devices as its components (in this example, there would be 11 domain members and 400 endpoints). The architecture can propagate queries and control messages from any of the domain members to any other member or endpoint in the cloud. In a particular instance, energy management system 10 communicates over Layer 3 using a defined packet format for message encapsulation. Alternatively, different packet formatting and/or other communication protocols (being transported at any appropriate layer) can readily be used in energy management system 10. Query events can retrieve power information from any domain. These can be delivered, hop-by-hop, through the domains using established neighbor information. Authentication can be achieved by the domain's shared secret, where authenticated queries can be sent to endpoints. Other security measures for data transmissions in energy management system 10 can include encapsulation, security handshakes, IPsec, encryption mechanisms, etc.

Figure 4:
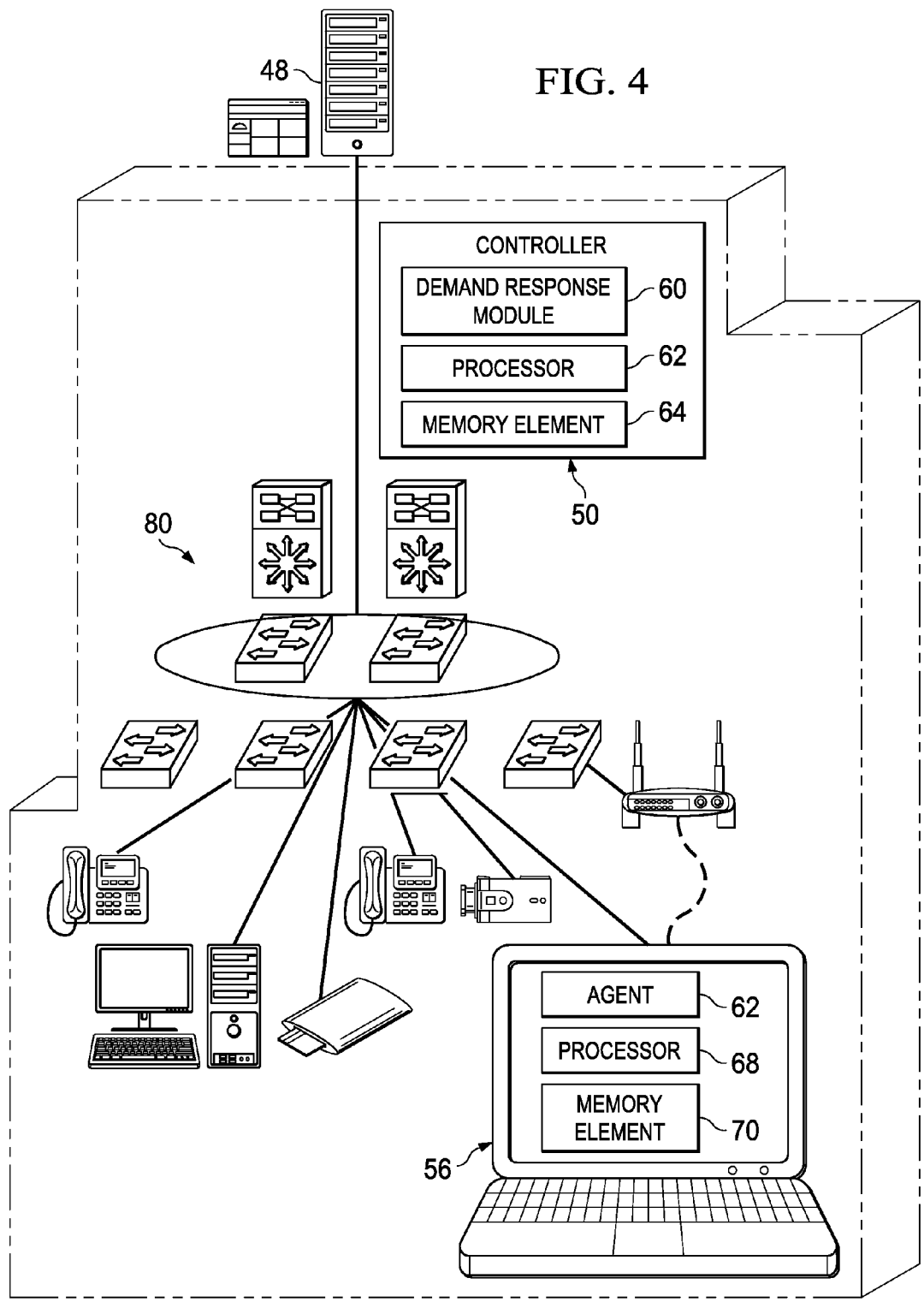
FIG. 4 is a simplified block diagram illustrating an example implementation of the system in accordance with one embodiment of the present disclosure.

FIG. 4 is a simplified block diagram illustrating one possible implementation associated with energy management system 10. This particular example includes a domain 80, a set of management applications 48, a controller 50, and an endpoint 56. Controller 50 includes a demand response module 60, a processor 62, and a memory element 64. Along similar lines, endpoint 56 includes a processor 68, a memory element 70, and an agent 62.

Controller 50 can maintain any number of data sets (e.g., tables, lists, policies, etc.) that can be used in the management of the architecture. For example, the data can reveal a given endpoint's identification or ID, the endpoint's role, the domain of the endpoint, the importance of the endpoint, the current energy levels of the endpoints, the battery capabilities of the endpoints (e.g., their ability to shift to a battery source), the current battery levels of the endpoints (e.g., including a low battery level threshold, which can be reflective of vulnerabilities for data loss), a respective management interface for the endpoints, any respective children of the endpoints, any possible neighbors of the endpoints, etc.

Domain 80 can report power data in various forms, for example, reporting power per-wiring closet. In addition, there can be a MIB-summary of power per-switch or per-location. This would allow power and cost savings to be readily determined. Power policies can be sent to the network, where policies are propagated to individual endpoints, switches, controllers, etc. For example, a policy could be propagated to building switches that indicates to shut all phones down in the building at 8 PM. Another example could involve moving HVAC systems to certain levels after the workday has concluded. Another example could involve switching power sources to battery for all PCs during the lunch hour (e.g., 12 PM-2 PM).

In one example implementation, each endpoint 18 and such or controller 50 can include software to achieve the optimal energy management operations, as outlined herein in this document. For example, controller 50 may include software (e.g., demand response module 60), which is configured to intelligently evaluate an opportune time for sending broadcast messages to endpoints 18 (for switching between power sources). In addition, endpoints 18 can include agent 62 to receive incoming broadcast messages for shifting between power sources. In other examples, that software does not necessarily have to be resident on controller 50 and/or endpoints 18 themselves but, rather, could be included at some other node that can be accessed such that endpoints can switch between power sources. In example embodiments, simple network access can be leveraged to offer the capability for an end user to control energy parameters in a given domain.

Controller 50 is a network element configured to interact with endpoints 18 in order to manage energy usage in energy management system 10. Note that controller 50 can readily be part of a server in certain embodiments of this architecture, or provisioned in conjunction with management applications 12. As used herein in this Specification, the term 'network element' is meant to encompass proprietary devices, servers, network appliances, routers, switches, management appliances, gateways, bridges, loadbalancers, firewalls, processors, modules, or any other suitable device, note, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Software for providing intelligent energy management functionalities can be provided at various locations. In one example implementation, this software is resident in a network element (e.g., provisioned in controller 50 and/or endpoint 56) or in another network element for which this capability is relegated. In other examples, this could involve combining domain devices, controller 50 and/or endpoint 56 with an application server, a firewall, a gateway, or some proprietary element, which could be provided in (or be proximate to) these identified network elements, or this could be provided in any other device being used in a given network. In other embodiments, each endpoint 18 and/or each instance of controller 50 may include any suitable algorithms, hardware, software, components, modules, interfaces, or objects that facilitate these energy management operations. This may be inclusive of appropriate communication protocols that allow for the effective exchange of data or information for achieving energy management in a network environment.

In still other embodiments, the energy management features may be provided externally to controller 50 and/or endpoint 56, or included in some other network device, or in a computer to achieve these intended functionalities. As identified previously, a network element can include software to achieve the energy management operations, as outlined herein in this document. In certain example implementations, the energy management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in some of the preceding FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in some of the preceding FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, the endpoints, etc.) can include memory elements for storing information to be used in achieving the energy management activities as outlined herein. Additionally, each of these devices may include a processor that can execute software or an algorithm to perform the energy management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Figure 5A:
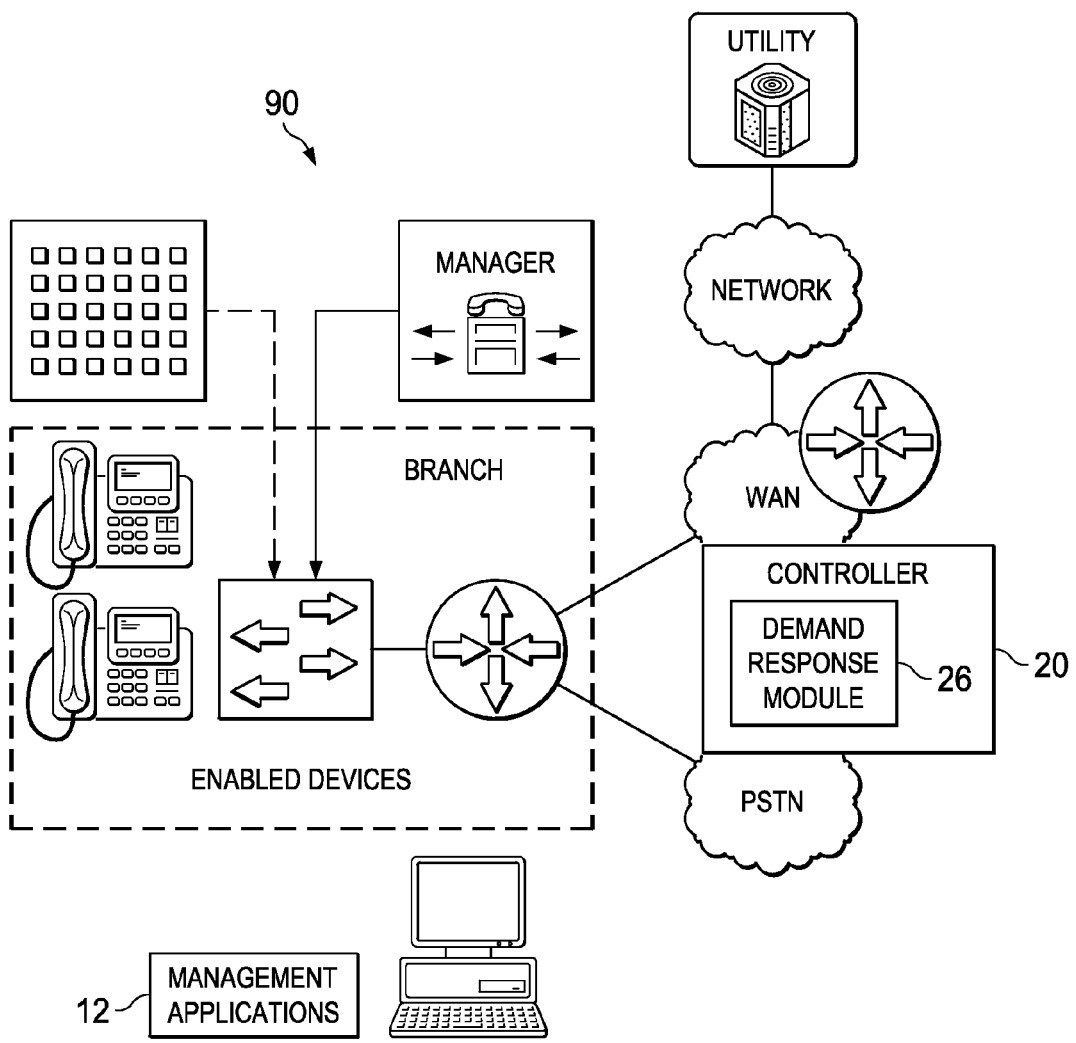
FIG. 5A is a simplified block diagram illustrating an example configuration in accordance with one embodiment of the present disclosure.

FIG. 5A is a simplified block diagram depicting a bank customer branch office configuration 90. This particular office is in operation between 9 AM and 5 PM. The intentions of the administrator are to switch the resident devices to a battery mode during the lunch hour, where power would be returned at 1 PM when the employees return to their desks. This particular scenario includes a manager element, which is coupled to a branch that includes a legacy phone and a switch. The devices within the branch are enabled such that they can be controlled by a given switch that is coupled to the network. Furthermore, this particular arrangement includes management applications 12, which allow an administrator to control the energy consumption activities of the branch. Note that a utility entity is also being depicted in FIG. 5A, where the utility entity (e.g., an energy company, a state utility company, a third-party that can provide certain energy information, etc.) has a network connection such that energy information can propagate to an administrator, to controller 50, etc. This energy information (e.g., energy demand data, energy pricing information, etc.) can include appropriate pricing information, energy costs more generally, peak time energy demand information, current billing information, appropriate discounts being offered for certain energy consumption (or reductions in energy consumption), energy budgeting for a given day, week, month, year, etc., current market pricing for energy (e.g., kw-hr. pricing, mw-hr. pricing, eV pricing, etc.).

Logistically, certain items or elements can be provisioned for the intelligent energy management system to function. For example, the enabled endpoints of FIG. 5A can include an agent (for example, in software) that allows these endpoints to respond to broadcast messages from the network. Note that the term 'broadcast message' as used herein in this Specification is meant to encompass any type of signaling, packet information, messaging, short message service (SMS) communications, instant messaging (IM), e-mail protocols, or any other message type that can be delivered to an endpoint such that it understands to switch between available power sources.

Agent 62 is configured to interpret incoming broadcast messages and to facilitate an appropriate response (e.g., followed the recommendation and switch between power sources, determine not to follow the instructions of the broadcast message, evaluate battery levels for its endpoint, acknowledge the broadcast message, confirm its subsequent actions for controller 50, decline any part of the recommendations in the broadcast message, etc.). During initial provisioning of a given endpoint, agent 62 can also be configured to allow the enabled endpoints to become part of the cloud, which can be managed by the devices inside the cloud. Much like certain network management applications, any device within the network can be used as a central management hub. Thus, any simple PC could be used to connect to the cloud in order to control one or more operations of enabled endpoints. This is in contrast to other systems that require administrators to operate from a central server exclusively. In this sense, the energy management system can use any enabled device as a point of management for other devices in the network.

Figure 5B:
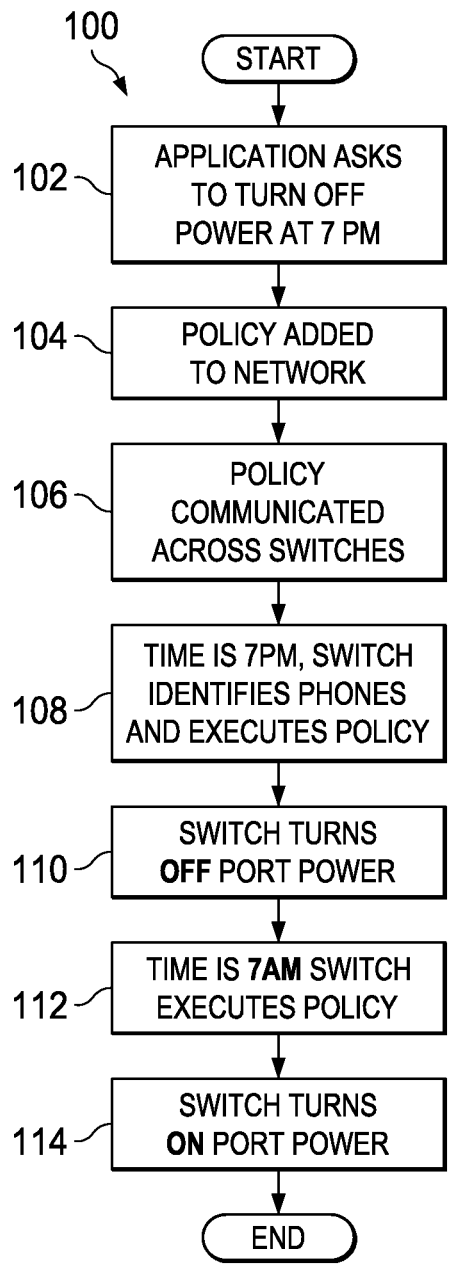
FIG. 5B is a simplified flowchart illustrating a series of example activities associated with the system.

FIG. 5B is a simplified flowchart 100 that illustrates a basic energy management provisioning for a set of endpoints. In a more complex scenario, FIG. 6 (discussed below) addresses provisioning of endpoints for which recommendations are given to change to an available battery source. The simplistic flow of FIG. 5B covers the scenario where a given administrator is attempting to turn off all power at 7 PM in a particular office setting. Power would then resume at 7 AM when employees are returning to work. This particular flow begins at 102, where the management application requests endpoints to turn off their power at the office at 7 PM. This can allow each endpoint (e.g., phones, PCs, etc.) to either turn off completely, or switch to a battery mode, which may be based on a configured policy.

At 104, a policy is added to the network such that it may be systematically executed (e.g., until changed by the administrator). At 106, the policies are communicated across switches that can control one or more devices, which are enabled to respond to such direction(s). At 108, the intelligence in a given switch identifies the phones for which it is responsible and executes the outlined policy. At 110, the switch turns off the port power for particular endpoints. At 112, the switch again executes its policy for the 7 AM timeframe. The switch would then turn on the port power, at 114.

Note these examples can involve identifying peak power times in smoothing or time shifting the power usage in a given environment. For example, a management application can monitor power consumption and receive a peak power alert. A policy can be created to minimize this peak consumption by leveraging battery energy sources. Part of this policy may include identifying eligible phones, laptops, and building HVAC systems that could be candidates for shifting to battery energy sources. For example, in the context of these identified devices, a laptop could move to battery power, eligible phones could also move to battery power (e.g., a building generator, which has stored energy), printers could move to a sleep mode, and the building temperature can be adjusted to coincide with the ambient temperature.

Figure 6:
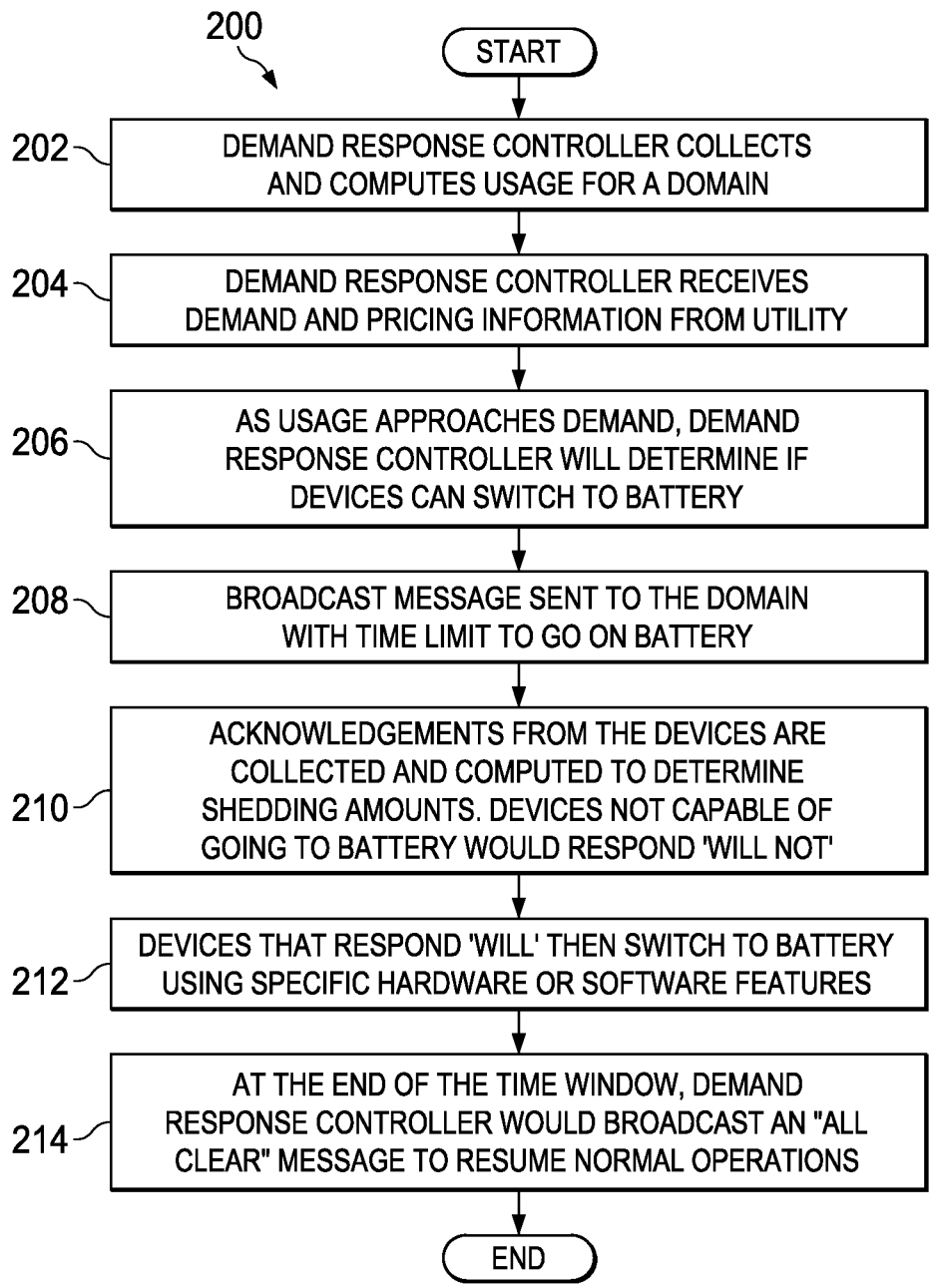
FIG. 6 is a simplified flowchart illustrating another series of example activities associated with one implementation of the system.

FIG. 6 a simplified flowchart 200 illustrating one possible implementation associated with the present disclosure. This particular flow may begin at 202, where demand response controller (e.g., controller 20) collects and computes usage for a domain. At 204, the demand response controller receives demand and pricing information from a given utility entity. At 206, as usage approaches demand (e.g., capped kW or price limit), the demand response controller is configured to determine if endpoints can switch their power sources to a battery option.

At 208, a broadcast message can be sent to the domain, along with a time limit to shift to a battery source. At 210, acknowledgments (e.g., ACK's) from the devices are collected and computed to determine energy shedding (i.e., energy allocation) amounts. The acknowledgments can indicate whether the devices would move to their battery source, or decline to utilize their battery source. In any event, the acknowledgments communicated (by the endpoints to a given controller) inform the controller about which devices would adhere to the broadcast message recommendation. This would allow the controller to plan accordingly. For example, due to a series of decline acknowledgments, the controller may elect to send out additional broadcast messages to achieve a certain energy demand target. Note that in certain implementations, business contexts can be used to widen, or to narrow the (audience) devices receiving the broadcast messages. Devices not capable of shifting to a battery source can respond accordingly (e.g., 'Will Not', 'Decline', etc.). Note that the controller may interpret a lack of a response from the endpoints as a 'Decline' in order to conservatively meet an energy level target. [Note also that there can be a discovery mechanism in place such that the endpoints capable of even switching their power sources to battery would already be known by the controller. Hence, the broadcast messages can be selectively sent based on that information, which may be collected a priori, or based on historical events in which certain endpoints previously switched to battery sources, etc.]

At 212, devices that previously responded 'Will' would switch to a battery source using specific hardware or software features (e.g., Intel vPro, Windows Applications, WMI, DASH, Linux open methods, vehicular applications (for managing car batteries, motorcycle batteries, airplane batteries, etc.). In other arrangements, power bricks (power supplies) would also receive commands from devices to alleviate systematic power draws (e.g., a vampire draw). At 214, once the prescribed time window has concluded, the demand response controller would broadcast an "All Clear" to resume normal operations. This could involve any suitable default protocol such as resuming normal power source activities, shifting to a hibernate state, powering off until otherwise instructed, etc.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that energy management system 10 (and its teachings) are readily scalable and, further, can accommodate a large number of components, as well as more complicated/sophisticated arrangements and configurations. Accordingly, the examples provided should not limit the scope or inhibit the broad teachings of energy management system 10, as potentially applied to a myriad of other architectures.

It is also important to note that the steps in the preceding FIGURES illustrate only some of the possible scenarios that may be executed by, or within, energy management system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by energy management system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols (e.g., UDP, SSL, SNMP, etc.), energy management system 10 may be applicable to other exchanges and protocols in which data are exchanged in order to provide energy management operations. In addition, although energy management system 10 has been illustrated with reference to particular elements and operations that facilitate the communication process, these elements and operations may be replaced by any suitable architecture or process that achieves the intended functionality of energy management system 10.

In alternative embodiments, the present disclosure can be applied to any type of vehicles, which are operating in a charging scenario. For example, at peak times, a given electric car can disconnect from its charging activities involving a power outlet. Other scenarios can involve a home energy controller (HEC) being provided in conjunction with a suitable battery source. The power source can be changed, where the change is triggered by a broadcast message, as being discussed herein.

Note that other systems, such as those related to vehicular applications (e.g., Vehicle to Grid (VTG)) can also readily implement the teachings of the present disclosure. In particular systems, the battery of a car would be used to inject power into the grid when the grid experiences a period when demand exceeds supply. VTG systems (like other controlled charging mechanisms) provide a mechanism for stopping the charging process if the grid experiences a high demand condition. Energy management system 10 is configured to initiate a switch to a backup battery programmatically, as detailed above. Still other architectures associated with different types of vehicles (e.g., airplanes, motorcycles, trains, Segways, etc.) could readily adopt the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
computing energy usage associated with a domain that includes a plurality of endpoints;
identifying particular endpoints of the plurality of endpoints that are capable of switching from a first power source to a battery power source; and
communicating a broadcast message to the particular endpoints to switch to their corresponding battery power source.

2. The method of claim 1, further comprising:
receiving energy demand data;
receiving energy pricing information; and
identifying a time interval associated with higher energy demands, wherein the broadcast message before the time interval occurs.

3. The method of claim 1, wherein the broadcast message includes a time interval for which the particular endpoints use their corresponding battery power source.

4. The method of claim 1, further comprising:
communicating a second broadcast message to the particular endpoints to discontinue using their corresponding battery power source.

5. The method of claim 1, further comprising:
receiving acknowledgments from at least some of the particular endpoints, wherein the acknowledgments indicate that at least some of the particular endpoints will switch to their corresponding battery power source.

6. The method of claim 1, wherein a discovery protocol is used in order to identify which of the plurality of endpoints have a capability to switch to their corresponding battery power source.

7. The method of claim 1, wherein at least some of the particular endpoints evaluate their current battery level in order to determine that a recommendation within the broadcast message will not be followed.

8. The method of claim 1, wherein the broadcast message indicates at least some of the particular endpoints should switch to their corresponding battery source until associated battery levels fall below a designated percentage of battery life.

9. Logic encoded in non-transitory media that includes code for execution and when executed by a processor operable to perform operations comprising:
computing energy usage associated with a domain that includes a plurality of endpoints;
identifying particular endpoints of the plurality of endpoints that are capable of switching from a first power source to a battery power source; and
communicating a broadcast message to the particular endpoints to switch to their corresponding battery power source.

10. The logic of claim 9, the operations further comprising:
receiving energy demand data;
receiving energy pricing information; and
identifying a time interval associated with higher energy demands, wherein the broadcast message before the time interval occurs.

11. The logic of claim 9, wherein the broadcast message includes a time interval for which the particular endpoints use their corresponding battery power source.

12. The logic of claim 9, the operations further comprising:
communicating a second broadcast message to the particular endpoints to discontinue using their corresponding battery power source.

13. The logic of claim 9, wherein a discovery protocol is used in order to identify which of the plurality of endpoints have a capability to switch to their corresponding battery power source.

14. The logic of claim 9, wherein at least some of the particular endpoints evaluate their current battery level in order to determine that a recommendation within the broadcast message will not be followed.

15. The logic of claim 9, wherein the broadcast message indicates at least some of the particular endpoints should switch to their corresponding battery source until associated battery levels fall below a designated percentage of battery life.

16. An apparatus, comprising:
a memory element configured to store electronic code;
a processor operable to execute instructions associated with the electronic code; and
a demand response module configured to interface with the processor such that the apparatus is configured for:
computing energy usage associated with a domain that includes a plurality of endpoints;
identifying particular endpoints of the plurality of endpoints that are capable of switching from a first power source to a battery power source; and
communicating a broadcast message to the particular endpoints to switch to their corresponding battery power source.

17. The apparatus of claim 16, wherein the apparatus is further configured for:
receiving energy demand data;
receiving energy pricing information; and
identifying a time interval associated with higher energy demands, wherein the broadcast message before the time interval occurs.

18. The apparatus of claim 16, wherein the broadcast message includes a time interval for which the particular endpoints use their corresponding battery power source.

19. The apparatus of claim 16, further comprising:
communicating a second broadcast message to the particular endpoints to discontinue using their corresponding battery power source.

20. The apparatus of claim 16, wherein a discovery protocol is used in order to identify which of the plurality of endpoints have a capability to switch to their corresponding battery power source, and wherein at least some of the particular endpoints evaluate their current battery level in order to determine that a recommendation within the broadcast message will not be followed.

* * * * *